United States Patent
Nishizawa

[11] Patent Number: 6,047,794
[45] Date of Patent: Apr. 11, 2000

[54] VIBRATION DAMPER FOR USE IN WHEEL BRAKE

[75] Inventor: Yukio Nishizawa, Itami, Japan

[73] Assignee: Sumitomo Electric Industries, Ltd., Osaka, Japan

[21] Appl. No.: 08/988,404

[22] Filed: Dec. 10, 1997

[30] Foreign Application Priority Data

Dec. 19, 1996 [JP] Japan ................................. 8-339883

[51] Int. Cl.⁷ ....................................................... F16D 65/38
[52] U.S. Cl. ...................................... 188/73.36; 188/73.37
[58] Field of Search ............................. 188/73.35, 73.36, 188/73.37, 72.4, 250 E, 264 G; 303/194; 381/71.14, 94.1

[56] References Cited

U.S. PATENT DOCUMENTS

| | | | |
|---|---|---|---|
| 4,153,815 | 5/1979 | Chaplin et al. | 179/1 P |
| 4,417,098 | 11/1983 | Chaplin et al. | 381/94 |
| 4,490,841 | 12/1984 | Chaplin et al. | 381/71 |
| 4,562,589 | 12/1985 | Warnaka et al. | 381/71 |
| 5,418,858 | 5/1995 | Shoureshi | 381/71.14 |
| 5,426,705 | 6/1995 | Yokota et al. | 381/71.14 |
| 5,660,251 | 8/1997 | Nishizawa et al. | 188/73.35 |
| 5,667,047 | 9/1997 | Weiss et al. | 192/55.61 |
| 5,687,818 | 11/1997 | Nishizawa et al. | 188/73.35 |
| 5,860,494 | 1/1999 | Nishizawa et al. | 188/73.35 |
| 5,865,515 | 2/1999 | Nishizawa | 188/73.36 |

FOREIGN PATENT DOCUMENTS

| | | |
|---|---|---|
| 0748947 | 9/1996 | European Pat. Off. . |
| 4-54324 | 2/1992 | Japan . |
| 4-54325 | 2/1992 | Japan . |

OTHER PUBLICATIONS

An English Language Abstract of JP 4–54324.
An English Language Abstract of JP 4–54325.

*Primary Examiner*—Christopher P. Schwartz
*Assistant Examiner*—Tom Williams
*Attorney, Agent, or Firm*—Greenblum & Bernstein, P.L.C.

[57] ABSTRACT

A vibration damper for detecting vibrations of break pads and vibrating the pads in such a way as to damp the vibrations detected. The damper has the function of adjusting control constants for a control circuit according to the degree of deterioration with time, of the pads due to wear so that vibrations of the pads can be damped in an optimum manner. A vibration detector means detects frictional vibrations of the pads and the disk rotor. A control signal corresponding to the detected vibration frequency is applied to a vibrator means through a control circuit. When an input signal for correction timing is inputted from an ignition switch, a signal generator transmits a signal having a predetermined frequency to the vibrator means. The resulting vibration is detected by a signal detector. Based on the detection signal, transfer functions for the control circuit are adjusted to suppress vibrations having squealing frequencies.

4 Claims, 4 Drawing Sheets

VIBRATION DAMPER FOR USE IN WHEEL BRAKE

BACKGROUND OF THE INVENTION

This invention relates to a vibration damper for use in a wheel brake for suppressing brake squeals during braking.

The braking pads vibrate and resonate when they are brought into frictional contact with its rotor to brake the wheel. Such resonance causes brake squeals. Unexamined Japanese patent publications 4-54324 and 4-54325 disclose vibration dampers for damping such brake squeals in an active manner.

The former publication discloses a vibration damper including a piezoelectric element as a vibrator for applying vibrations having a frequency out of the audible range to friction members (pads), and another vibration damper comprising a piezoelectric element as a vibration detector for detecting vibrations of the friction members, and another piezoelectric element for applying vibrations of inaudible frequencies to the friction members when the vibration detector detects vibrations of the friction members.

The vibration damper disclosed in the latter publication comprises a piezoelectric element as a vibration detector for detecting vibrations of the friction members, and a vibrator for applying vibrations which act to damp the vibrations detected by the vibration detector. In one embodiment, the vibrator applies vibrations having a 180° phase difference from the vibrations detected. In another embodiment, two piezoelectric elements are used.

It is generally believed that brake squeals have a frequency range of 1.5–12 kHz. On the other hand, the frequency range of sounds audible to humans has its upper limit at around 16–20 kHz and its lower limit at around 16–20 Hz. This means that brake squeals are audible to humans. Thus, the vibration dampers disclosed in the former publication, which are used to damp vibrations out of the audible frequency range, are useless as dampers for suppressing audible brake squeals.

In the vibration dampers disclosed in the latter publication, if the settings for the elements of the damper remain unchanged, the control circuit can not always perform its optimum vibration damping function due to inevitable changes, such as wear and quality change in material, of the pads with the lapse of time.

More specifically, control constants are set for the respective control elements of the control unit of a vibration damper when the damper is first put into use. In a conventional arrangement, it was impossible to adjust these constants even if the brake pads deteriorate with time. If, due to such age-related deterioration of the pads, the phase of the vibrations applied to the pads by the vibrator shifts 180°, such vibrations will increase, instead of reducing, vibrations of the pads.

In the arrangement of the latter publication, the vibration detector detects all the vibrations and does not judge whether or not the vibrations detected have a frequency that can cause brake squeals. Thus, the control circuit will be activated even when the detector detects vibrations having frequencies not within the squeak-causing frequency range, thereby unnecessarily vibrating the friction members with the vibrator means. This quickens wear of the friction members.

An object of this invention is to provide a vibration damper which makes it possible to adjust the control circuit if the control constants for the brake friction members change due to deterioration with time of the friction members, and thus to damp brake vibrations in an optimal manner.

SUMMARY OF THE INVENITON

According to this invention, there is provided a vehicle brake vibration damper comprising a vibration detector means for detecting vibrations of a vehicle brake having a rotary member and friction members, the vibration being produced when said rotary member is braked with the friction members, a control circuit which receives a signal from the detector means and outputs a signal for applying vibrations to the friction members to suppress the vibrations based on the vibrations detected, a vibrator means which receives the signal from the control circuit and applies vibrations to the friction members, and a signal generator for transmitting a signal to the vibrator means, the detector means detecting vibrations resulting from the signal from the signal generator to adjust the control circuit, whereby suppressing vibrations through the thus adjusted control circuit.

In this arrangement, the vibrator applies vibrations having a frequency corresponding to vibrations detected by the vibration detector to prevent brake squeals. While this vibration damping operation is repeated, the constants of transfer functions of the friction members tend to change due e.g. to wear.

Thus, if no adjustment is made, it will become gradually difficult to damp vibrations in an ideal manner. In the arrangement of the invention, the control constants for the control circuits are adjusted to ensure that vibration damping is always possible in an ideal manner.

This adjustment comprises the steps of transmitting a given frequency signal from a signal generator to the vibrator to vibrate the friction members with the vibrator, detecting the vibrations of the friction members with the detector, detecting variations in the control constants due to deterioration with time of the friction members based on both signals, and adjusting the control constants for the control circuit corresponding to the detected variations in the control constants.

The control circuit is generally composed of PID control elements. Thus, the above adjustment may be made by changing the constants for the transfer functions of the respective control elements according to the degree of deterioration with time of the friction members.

Other features and objects of the present invention will become apparent from the following description made with reference to the accompanying drawings, in which:

DETAILED DESCRIPTION OF THE PREFERRED EMBODIMENT

Figure 1:
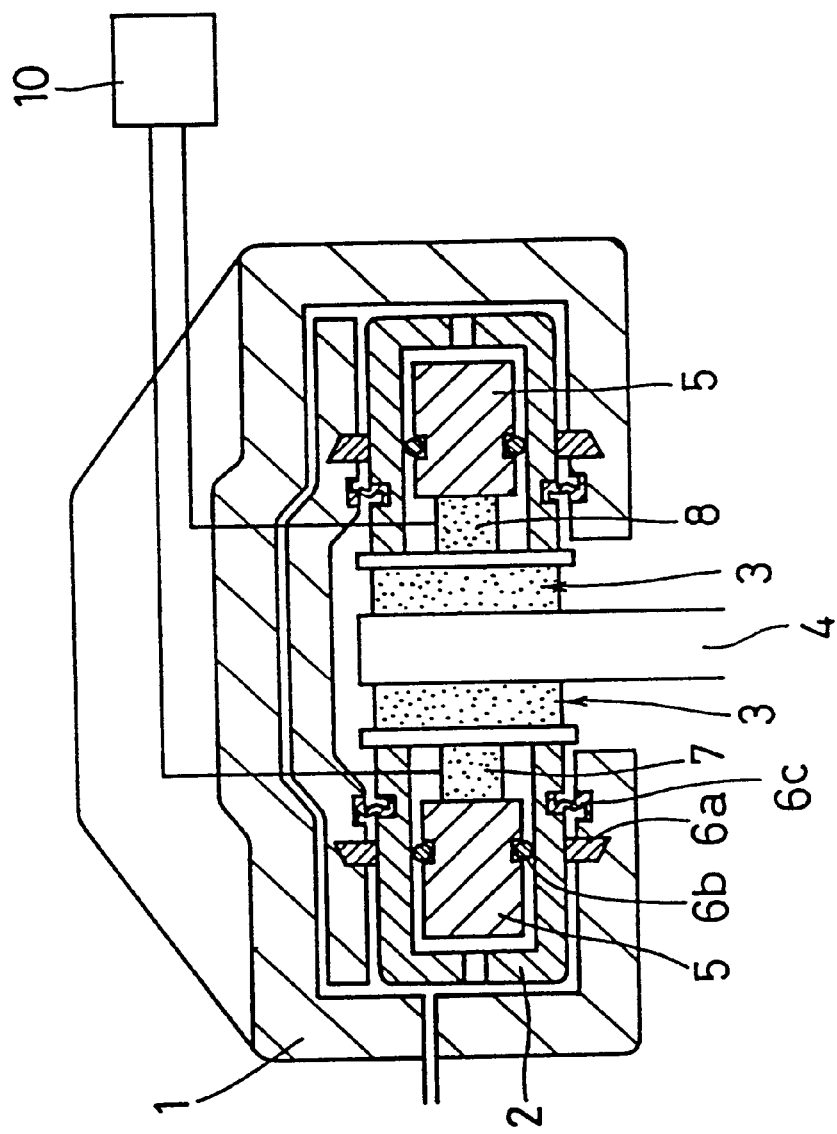
FIG. 1 is a sectional view of a disk brake equipped with a vibration damper of an embodiment.

Now referring to the figures, the embodiment of this invention is described. FIG. 1 shows a section of a disk brake provided with a vibration damper embodying the present invention. The disk brake of this embodiment has an opposed type caliper 1. As shown, a vibration detector means 7 and a vibrator means 8 are bonded or otherwise fixed to respective inner pistons 5 mounted in brake pistons 2 supported by the caliper 1. The detector 7 and vibrator means 8 are thus pressed against pads 3 by the inner pistons 5.

The detector and vibrator means used in this embodiment are laminated piezoelectric elements. But the detector means may be one having a strain gauge stuck thereto. The vibrator may be one having magnets or magnetizable members mounted on the pads for directly vibrating the pads with a magnetic force. Numeral 4 designates a disk rotor with which the pads 3 are brought into frictional contact. Numerals 6a, 6b are piston seals. Numeral 6c is a piston boot.

The pistons 5 are inserted in the respective brake pistons 2 having their outer periphery sealed by piston seals 6b so as to be slidable in the axial direction of the disk. Brake fluid stored under pressure in the fluid chamber defined by the caliper 1 is introduced into the brake pistons 2 through holes formed in the rear walls of the brake pistons 2 and applied to the back of the inner pistons 5. The pistons 5 are thus biased toward the pads 3, so that the detector 7 and the vibrator 8 are pressed against the back of the pads 3. With this arrangement, the pressures at which the detector 7 and vibrator means 8 are pressed against the pads is not influenced by the machining accuracy of the brake parts. Thus, the detector and the vibrator can perform their expected functions reliably even if the machining accuracy of the means 7 and 8 are not very high.

Figure 2:
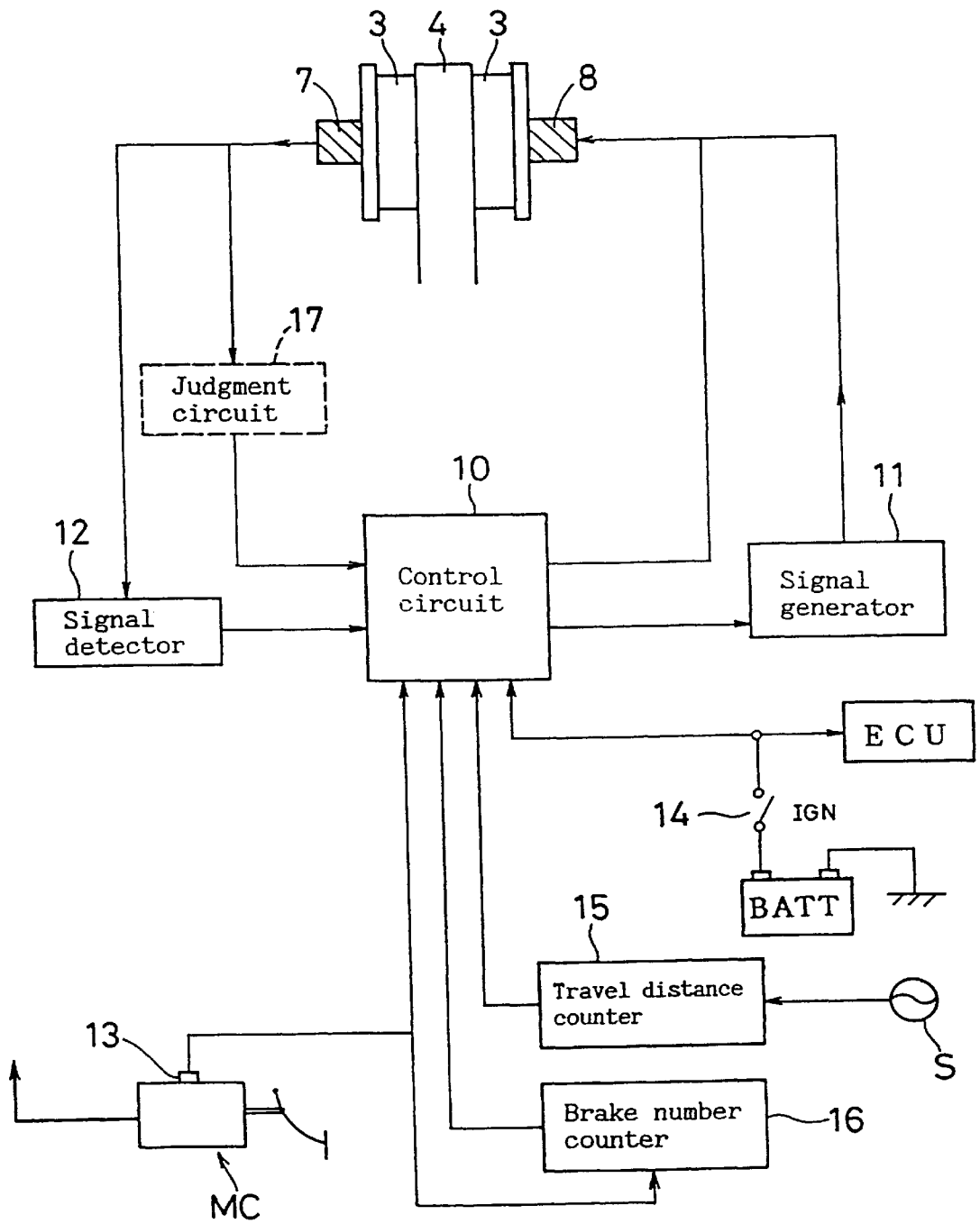
FIG. 2 is a schematic diagram of the vibration damper of FIG. 1.

Shown in FIG. 2 is a block diagram of the entire brake vibration damper of this embodiment, which is intended for use in a disk brake of the above-described type. As shown, in response to vibrations detected by the vibration detector 7, a control circuit 10 of the brake vibration damper gives a signal for damping the vibrations detected to the vibrator 8 to suppress squeals that may be produced during braking.

If a correction timing signal, to be described hereinbelow, is produced at correction timing, the control circuit 10 will adjust the constants for control elements. Specifically, if the control circuit 10 receives the correction timing signal, a frequency signal having a given frequency is transmitted from a signal generator 11 to the vibrator 8. When the detector 7 detects vibrations resulting from the frequency signal, it produces a signal, which is detected by a signal detector 12. Based on the detection signal from the signal detector 12, the control circuit 10 will adjust the constants for control elements.

This adjustment of constants is carried out while the vehicle brakes are being applied either while the vehicle is traveling or at a stop. In order to confirm that the brakes are applied, a signal from a brake. treading pressure sensor 13 for detecting the pressure in the brake master cylinder MC is inputted in the control circuit 10. The constant adjusting step is carried out:

1) when the ignition switch has been turned on;
2) when the vehicle has traveled a predetermined distance or when the brakes have been applied a predetermined number of times; or
3) when the vibrations detected have exceeded a threshold in spite of the fact that the brake vibration damper is activated (which means that the damper cannot effectively damp brake vibrations any more).

The control circuit 10 determines the timing of the constant adjustment based on a signal from one of an ignition (IGN) switch 14, travel distance counter 15, brake number counter 16 and judgment circuit 17 connected to the control circuit 10.

The judgment circuit 17 is also used not only to decide the correction timing but also to determine whether the control circuit 10 should activate the vibrator 8 to damp the vibrations. In the latter case, the circuit 17 is optionally (as shown by chain line) provided in the damper circuit having the abovementioned adjusting function.

Figure 3A:
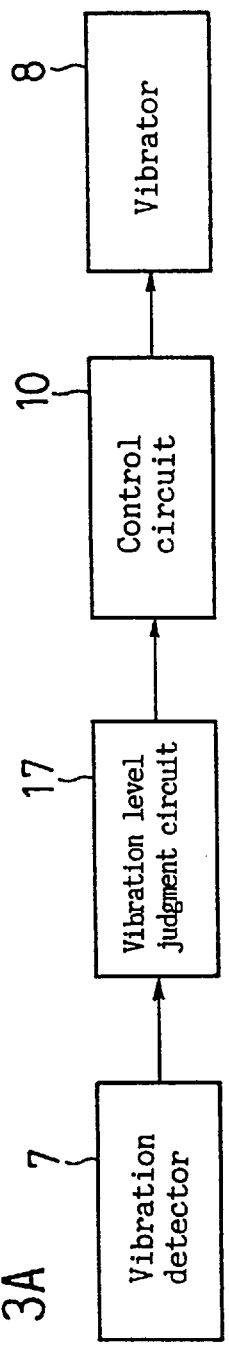
FIGS. 3A–3C show various judgment circuits.
Figure 3B:
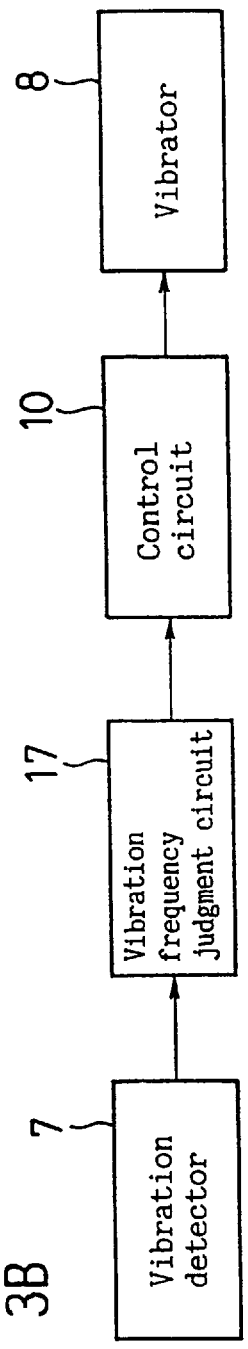
Figure 3C:
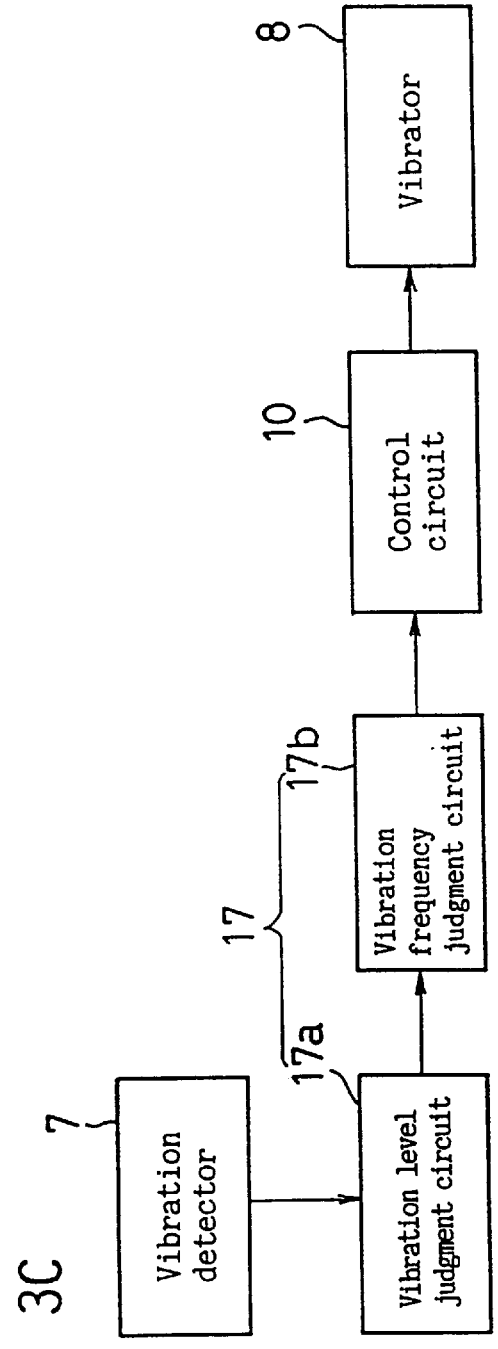

The judgment circuit 17 may have any of the circuit configurations a), b) and c) of FIG. 3. Circuit a) is adapted to activate the control circuit 10 only if the vibration level exceeds a threshold. Circuit b) activates it if the vibration frequency is within the brake squealing frequency range. Circuit c) activates it if both the above two conditions are met. Once activated, the control circuit 10 transmits a signal to the vibrator 8 to start vibration damping action.

Figure 4A:
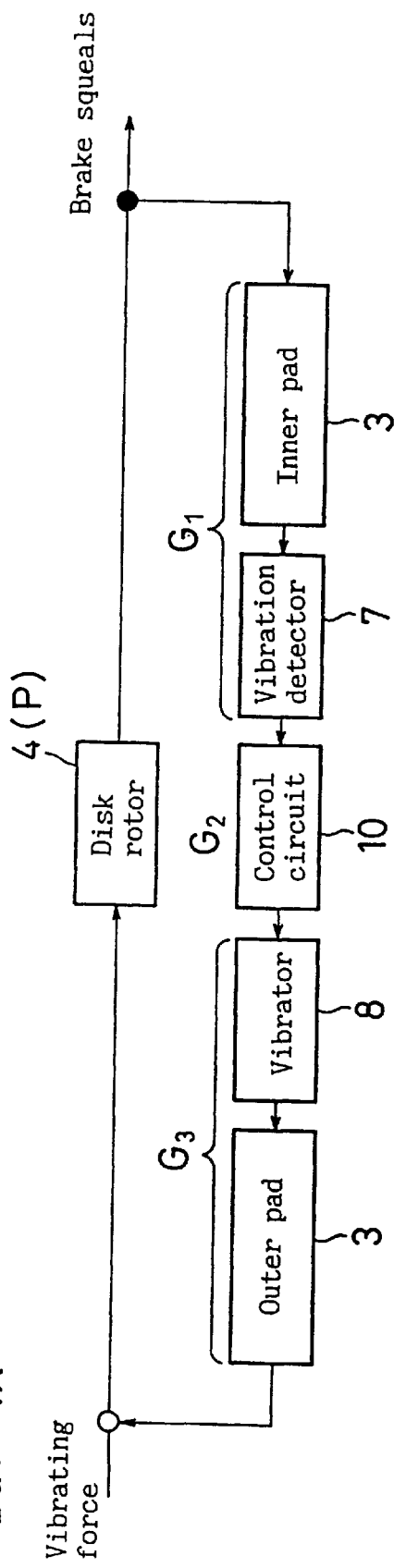
FIGS. 4A, 4B are diagrams showing the vibration damping function.
Figure 4B:
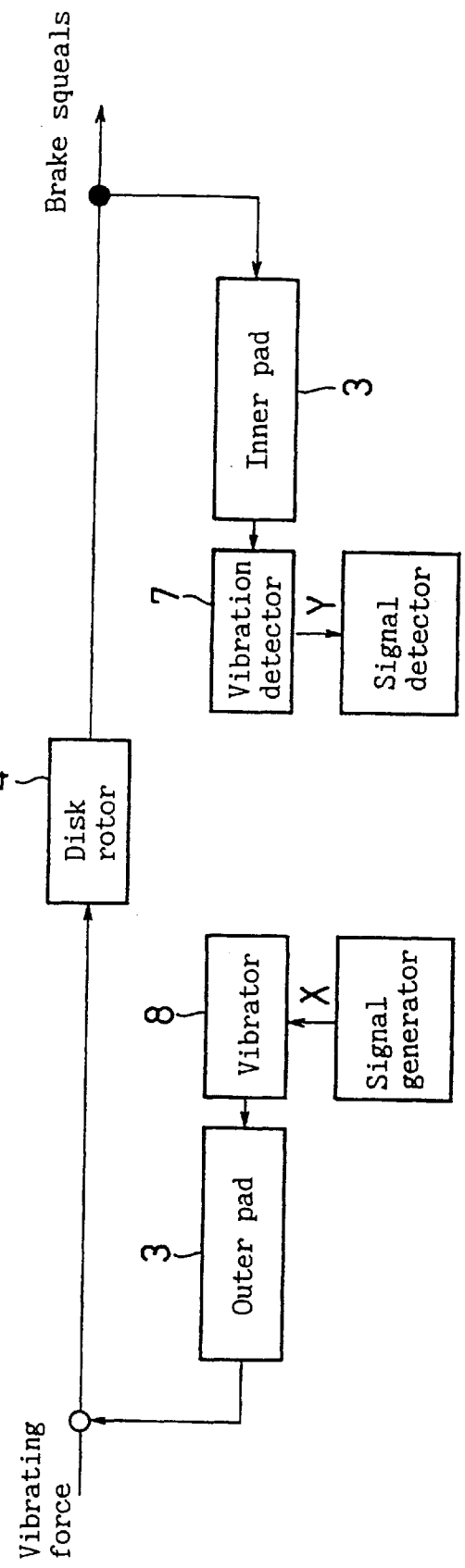

The operation of the brake vibration damper of this embodiment is now described with reference to FIG. 4, of which FIG. 4A is a block diagram of a feedback control circuit, and FIG. 4B is a partial block diagram for the adjusting function.

Vibrations (S) in the above-described vibration damping control systems are given by the following formula for use of transfer functions of the control elements:

$$S=P \cdot F/(1+G1 \cdot G2 \cdot G3 \cdot P) \qquad (1)$$

where P is the transfer function of the disk rotor;
G1 is the transfer function of the inner pads plus vibration detector;
G2 is the transfer function of the control circuit;
G3 is the transfer function of the vibrator plus outer pads;
S is the vibration of the rotor; and
F is the vibrating force such as friction force variations that can cause rotor vibration Rotor vibration is considered to be the major cause of brake squeals. Rotor vibration S is given by the above formula 1). Stopping squeals is to bring the value S as close to zero as possible.

In the above formula (1), the transfer function P of the disk rotor changes little with time. That is, the disk rotor is less likely to be worn or suffer change in material quality even after long use. In contrast, the friction members such as the inner and outer pads are much more quickly worn with use, so that their transfer functions G1 and G3 tend to change markedly with time. Thus, even though the transfer functions P, G1 and G3 are initially set at such values that the value S will be zero or near zero, the functions tend to shift with time, so that the value S may deviate from zero.

The vibration damper of the present invention can correct the transfer function G2 of the control circuit 10 so that it will be kept at an optimum value even if the other transfer functions change with time.

This correction step is carried out as follows. Since the correction step has to be carried out while the brake is being applied, when the control circuit 10 receives a signal from the brake actuation sensor 13 (FIG. 2) for detecting pressure in the brake master cylinder MC, a signal X of a given frequency is transmitted from the signal generator to the vibrator 8 (FIG. 4B).

The signal generator 11 may be one which can produce a signal of a predetermined frequency obtained by dividing a signal produced by a multivibrator or a crystal oscillator. The thus produced signal X is applied to the vibrator 8 to vibrate the outer pad 3 as shown in FIG. 4B. The inner pad 3 is thus vibrated by the outer pad 3 through the disk rotor 4. The detector 7 detects the vibration of the inner pad 3 and produces a detection signal Y, which is detected by the signal detector 12.

This operation is expressed by the following formula:

$$Y = G1 \cdot G3 \cdot P \cdot X \quad (2)$$

Thus, $Y/X = G1 \cdot G3 \cdot P$

By substituting this formula in the formula (1), the following formula results:

$$S = P \cdot F / \{1 + (Y/X) \cdot G2\} \quad (3)$$

Value (Y/X) in the formula (3) can be calculated based on the signals from the signal generator 11 and the signal detector 12. The transfer function P of the disk rotor scarcely changes with time. Thus, as the value (Y/X) changes with time, it is possible to keep the value S to zero or near zero by adjusting the transfer function G2 depending upon the value (Y/X), in the same manner as when the value G2 is initially set so that the value S is zero or near zero.

Though detailed circuit construction of the control circuit 10 is not shown, its transfer function G2 is given by the following formula if the circuit 10 is an ordinary PID controller is used as the circuit 10:

$$G2(S) = Kc(1 + 1/(TI \cdot s) + TD \cdot s) \quad (4)$$

where s is the Laplace operator;
Kc is the proportional constant;
TI is the integration constant; and
TD is the differential constant From this formula, it is apparent that the transfer constant G2 of the control circuit 10 is adjustable by correcting the constants Kc, TI and TD to optimum values. By varying these constants in combination, which are the constants of the proportional, integration and differential elements, respectively, it is possible to change the gain or shift the phase forward or backward, and thus to correct any change in gain and phase with time between the input and output of the control circuit 10.

For example, if the vibration of the pads has been shifted 180° out of phase with respect to the squeak-causing resonance of the disk rotor due to deterioration of the pads with time, such a phase difference is correctable by changing the constants of these elements to reverse the sign of the Kc value.

Such gain and phase corrections of the control circuit 10 are carried out in any of the above-mentioned timings or situations 1) to 3). When the control circuit 10 receives the correction timing signal, the adjustment control automatically starts.

The adjustment control is carried out in situation 1) or 2), when one of the ignition switch 14, travel distance counter 15 and brake number counter 16 produces a signal. The judgment circuit 17 may be optionally provided. If the circuit 17 is provided, it is used to carry out vibration damping operation only if the vibration level detected by the vibration detector 7 is higher than a threshold, and/or the vibration frequency detected by the detector 7 is within the squealing frequency range.

If the judgement circuit 17 is used as means for damping vibrations at correction timing 3), it is used if vibration is not properly damped even though ordinary vibration damping is carried out. The degree of effect of damping action is judged at the judgment section (not shown) of the judgment circuit. If a sufficient damping effect is not observed after lapse of a predetermined time of period, the judgement circuit 17 will change over the function of the control circuit 10 to adjustment control.

Although in this embodiment the squeak-causing frequency is assumed to be in the range of 1.5–12 kHz, the circuit arrangement may be made so that vibration damping will be carried out on the assumption that the squeak-causing frequency is within the range of 2–2.5 kHz.

If the damping operation is to be started if the vibration frequency exceeds a threshold, the threshold may be a value twice as great as the vibration level below which no brake squeals occur.

According to this invention, a signal having a frequency corresponding to the vibration detected by the vibration detector is transmitted from the control circuit to the vibrator means to suppress brake squeals. If the damping characteristics change due to deterioration, such as, wear of the friction members with time, a signal is transmitted from the signal generator to the vibrator, the vibration produced based on this signal is detected by the vibration detector, and based on the vibration thus detected, the control constant for the control circuit is corrected. With this arrangement, the control circuit can damp vibrations of the rotary member and thus suppress brake squeals in an ideal manner even when the friction members are worn or otherwise deteriorate after long use.

What is claimed is:

1. A vehicle brake vibration damper that dampens vibrations of a vehicle brake having a rotating member and a pair of friction members, the vibrations being created upon braking of the rotary member by the friction members, the vibration damper comprising:

a vibration detector for detecting vibrations of the vehicle brake and producing a first signal that represents vibrations of the vehicle brake;

a vibrator for producing vibrations to be applied to at least one of said friction members;

first control means for receiving said first signal from said vibration detector and producing a second signal for activating said vibrator based on said first signal and at least one control constant stored in said first control means; and second control means for producing and sending a predetermined third signal to said vibrator according to one of:
  while said first control means is not producing said second signal; and
  forcibly interrupting the control by said first control means;

said second control means further adjusting said at least one control constant based on said first signal, which is produced as a result of the application of said third signal to said vibrator, to a value such that brake vibrations are attenuated by vibrations applied by said vibrator based on said second signal.

2. A vehicle brake vibration damper according to claim 1, further comprising a judgment circuit that judges vibrations detected by said vibration detector and activates said second control means if said first signal indicates one of exceeding a predetermined threshold and the presence of a frequency within a squealing range.

3. A vehicle brake vibration damper according to claim 1, wherein, when a correction timing signal is input to said second control means, said second control means is activated to correct said at least one control constant.

4. A vehicle brake vibration damper according to claim 2, wherein, when a correction timing signal is inputted to said second control means, said second control means is activated to correct said at least one control constant.

* * * * *